United States Patent
Tiemeyer et al.

(10) Patent No.: US 12,338,901 B2
(45) Date of Patent: Jun. 24, 2025

(54) MULTI-WAY VALVE FOR A MOTOR VEHICLE AND METHOD FOR OPERATING A MULTI-WAY VALVE FOR A MOTOR VEHICLE

(71) Applicant: HELLA GmbH & Co. KGaA, Lippstadt (DE)

(72) Inventors: Sebastian Tiemeyer, Dortmund (DE); Frank Bewermeyer, Paderborn (DE); Dominik Niess, Selm (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 0 days.

(21) Appl. No.: 18/384,575

(22) Filed: Oct. 27, 2023

(65) Prior Publication Data

US 2024/0052936 A1    Feb. 15, 2024

Related U.S. Application Data (63) Continuation of application No. PCT/EP2022/052435, filed on Feb. 2, 2022.

(30) Foreign Application Priority Data

Apr. 30, 2021  (DE) .................. 10 2021 111 158.7

(51) Int. Cl.
*F16K 11/085*    (2006.01)
*F16K 11/083*    (2006.01)
(Continued)

(52) U.S. Cl.
CPC ...... *F16K 11/0856* (2013.01); *F16K 11/0836* (2013.01); *F16K 11/165* (2013.01);
(Continued)

(58) Field of Classification Search
CPC ............ F16K 11/0856; F16K 11/0836; F16K 37/0025; F16K 37/0033; F16K 37/0041; F16K 37/0058
See application file for complete search history.

(56) References Cited

U.S. PATENT DOCUMENTS 4,655,252 A    4/1987  Krumhansl
8,465,277 B2 *  6/2013  Deng .................... F24H 9/1881
                                                431/278
(Continued)

FOREIGN PATENT DOCUMENTS

DE    112013002082 T5    12/2014
DE    112014000253 B4    10/2019
JP    H08128819 A  *    5/1996

OTHER PUBLICATIONS

International Search Report dated Jun. 22, 2022 in corresponding PCT/EP2022/052435.

*Primary Examiner* — Atif H Chaudry
(74) *Attorney, Agent, or Firm* — Muncy, Geissler, Olds & Lowe, P.C.

(57) ABSTRACT

A multi-way valve for a motor vehicle, having a housing, in which a lower and upper chamber are disposed one above the other along an axis of rotation and are separated from each other by a separating wall. A lower valve body is disposed in the lower chamber for rotation about the axis of rotation. An upper valve body is disposed in the upper chamber for rotation about the axis of rotation. A drive shaft drives the lower and upper valve bodies. The drive shaft is torque-transmittingly connected to one of the two valve bodies and said valve body is torque-transmittingly connected to the other of the two valve bodies. A checking device checks for a correct alignment, and, in the event of an incorrect relative alignment of the two valve bodies in the (Continued)

peripheral direction, a reaction to the incorrect alignment can be automatically triggered.

9 Claims, 7 Drawing Sheets

(51) Int. Cl.
*F16K 11/16* (2006.01)
*F16K 37/00* (2006.01)
*B60K 1/00* (2006.01)

(52) U.S. Cl.
CPC ...... *F16K 37/0025* (2013.01); *F16K 37/0033* (2013.01); *F16K 37/0058* (2013.01); *B60K 2001/003* (2013.01)

(56) References Cited

U.S. PATENT DOCUMENTS

| | | |
|---|---|---|
| 9,657,861 B2 | 5/2017 | Enomoto et al. |
| 9,695,734 B2 | 7/2017 | Carns et al. |

\* cited by examiner

MULTI-WAY VALVE FOR A MOTOR VEHICLE AND METHOD FOR OPERATING A MULTI-WAY VALVE FOR A MOTOR VEHICLE

This nonprovisional application is a continuation of International Application No. PCT/EP2022/052435, which was filed on Feb. 2, 2022, and which claims priority to German Patent Application No. 10 2021 111 158.7, which was filed in Germany on Apr. 30, 2021, and which are both herein incorporated by reference.

BACKGROUND OF THE INVENTION

Field of the Invention

The present invention relates to a multi-way valve for a motor vehicle and to a method for operating a multi-way valve for a motor vehicle.

Description of the Background Art

Multi-way valves for motor vehicles and methods for their operation are already known from the state of the art in numerous design variants. The known multi-way valves for motor vehicles comprise a housing in which a lower and upper chamber are disposed one above the other along an axis of rotation and are separated from each other in a substantially sealed manner by means of a separating wall, a lower valve body which is disposed in the lower chamber for rotation about the axis of rotation, an upper valve body which is disposed in the upper chamber for rotation about the axis of rotation, and a drive shaft for automatically driving the lower and upper valve bodies, wherein the drive shaft is torque-transmittingly connected to one of the two valve bodies and said valve body is torque-transmittingly connected to the other of the two valve bodies.

SUMMARY OF THE INVENTION

It is therefore an object of the present invention to improve a multi-way valve for a motor vehicle and a method for operating a multi-way valve for a motor vehicle.

The object is achieved by a multi-way valve for a motor vehicle, which is characterized in that the multi-way valve has a checking device for checking the correct alignment in the peripheral direction of the lower valve body relative to the upper valve body, and, depending on an incorrect relative alignment of the two valve bodies in the peripheral direction, a reaction to said detected incorrect alignment can be automatically triggered. Further, the object is achieved by a method for operating a multi-way valve for a motor vehicle.

In particular, a significant advantage of the invention is that a multi-way valve for a motor vehicle and a method for operating a multi-way valve for a motor vehicle are improved. Due to the design of the multi-way valve for a motor vehicle according to the invention and the method for operating a multi-way valve for a motor vehicle, mechanical damage to the multi-way valve of the invention, for example, can be reliably detected, in particular on the valve body, which is only driven indirectly by means of the valve body driven directly by means of the drive shaft. The aforementioned mechanical damage can be, for example, a failure of the positive and/or non-positive connection between the valve body, which is only indirectly driven, and the valve body, which is directly driven by means of the drive shaft.

In principle, the multi-way valve of the invention for a motor vehicle can be freely selected within wide suitable limits in terms of type, functioning, material, and dimensioning. For example, the multi-way valve of the invention for a motor vehicle can be advantageously used in a cooling system for an electric vehicle.

The checking device can comprise a controller and a sensor, connected to the controller in a signal-transmitting manner, for automatically determining an actual angle of rotation when the two valve bodies are rotated from a first end position to a second end position, wherein the actual angle of rotation is compared in the controller with a predetermined nominal angle of rotation when the two valve bodies rotate about the axis of rotation, and wherein the actual angle of rotation, with a correct relative alignment in the peripheral direction of the two valve bodies, corresponds to the nominal angle of rotation. In this way, the presence of mechanical damage in the multi-way valve of the invention can be realized in a particularly simple and reliable manner.

The checking device also can comprise a lower sliding block-sliding block guide pair, disposed on the separating wall and the lower valve body, and an upper sliding block-sliding block guide pair, disposed on the separating wall and the upper valve body. In this way, the checking device of the multi-way valve of the invention can be implemented in a particularly simple and robust manner in terms of design and production technology.

The sliding block guides of the two sliding block-sliding block guide pairs can be arranged offset from each other in the peripheral direction such that the first end position is mechanically fixed by means of the one sliding block-sliding block guide pair and the second end position is mechanically fixed by means of the other sliding block-sliding block guide pair. This enables the mechanical design of the checking device of the multi-way valve of the invention in a very simple way.

The nominal angle of rotation can be 180°, wherein each of the sliding block guides of the two sliding block-sliding block guide pairs enables a range of rotation angles greater than 180°. The aforementioned angle of rotation is particularly suitable for the application of the multi-way valve of the invention.

The housing can have a housing shell, wherein a lower and upper open end of the housing shell are substantially tightly coverable by means of a lower and upper housing cover, wherein a drive shaft opening for the passage of the drive shaft is arranged in one of the housing covers. In this way, the housing can be realized in a particularly simple manner in terms of design and production technology.

The drive shaft can be formed as an integral part of the lower or upper valve body. This further simplifies the design and manufacture of the multi-way valve of the invention.

The valve body, which can be torque-transmittingly connected to the drive shaft, can be mechanically connected to the other valve body by means of a coupling for the purpose of torque transmission, wherein the coupling has a lower coupling part, associated with the lower valve body, and an upper coupling part, associated with the upper valve body, and wherein the lower or upper coupling part projects through a coupling opening in the separating wall, and preferably that the lower coupling part is formed as an integral part of the lower valve body and/or the upper coupling part is formed as an integral part of the upper valve body. In this way, the torque-transmitting connection between the two valve bodies for joint rotation about the axis of rotation can be realized very easily.

A separate seal can be disposed in each case between the housing and the lower valve body and/or the upper valve body and/or between the housing shell and the lower and/or upper housing cover and/or between the drive shaft and the lower or upper housing cover and/or between the separating wall and the lower or upper coupling part. This considerably simplifies the sealing of the multi-way valve of the invention to the free environment, on the one hand, and the sealing of the individual components of the multi-way valve of the invention moving relative to each other, on the other hand. Further, it is possible to better adapt the respective seal to the requirements of the particular individual case. This applies, for example, to the selection of materials. In principle, however, it is possible for the aforementioned seals to be formed, at least in part, as an integral part of one of the aforementioned components of the multi-way valve of the invention.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

FIG. 3b shows the example in an exploded view corresponding to FIG. 3a;

DETAILED DESCRIPTION

FIGS. 1 to 4b show an example of the multi-way valve of the invention for a motor vehicle purely by way of example.

Multi-way valve 2 for a cooling system of an electric vehicle comprises a housing 4 in which a lower and upper chamber 6, 8 are disposed one above the other along an axis of rotation 10 and are separated from each other in a substantially sealed manner by means of a separating wall 12, a lower valve body 14, which is disposed in lower chamber 6 for rotation about axis of rotation 10, an upper valve body 16, which is disposed in upper chamber 8 for rotation about axis of rotation 10, and a drive shaft 18 for automatically driving lower and upper valve bodies 14, 16, wherein drive shaft 18 is torque-transmittingly connected to upper valve body 16 and said valve body 16 is torque-transmittingly connected to lower valve body 14. In the present example, drive shaft 18 is formed as an integral part of upper valve body 16.

According to the invention, multi-way valve 2 has a checking device 20 for checking the correct alignment in the peripheral direction of lower valve body 14 relative to upper valve body 16. Depending on an incorrect relative alignment of the two valve bodies 14, 16 in the peripheral direction, a reaction to said detected incorrect alignment can be automatically triggered.

Checking device 20 has a controller, and a sensor, which is connected to the controller in a signal-transmitting manner, for automatically determining an actual angle of rotation when the two valve bodies 14, 16 are rotated from a first end position to a second end position, wherein the actual angle of rotation is compared in the controller with a predetermined nominal angle of rotation when the two valve bodies 14, 16 rotate about axis of rotation 10, and wherein the actual angle of rotation, with a correct relative alignment in the peripheral direction of the two valve bodies 14, 16, corresponds to the nominal angle of rotation.

Checking device 20 further comprises a lower sliding block-sliding block guide pair 22, 24, disposed on separating wall 12, and lower valve body 14 and an upper sliding block-sliding block guide pair 26, 28, disposed on separating wall 12 and upper valve body 16. The lower sliding block-sliding block guide pair 22, 24 comprises sliding block 22, integrally formed on lower valve body 14, and sliding block guide 24, formed as a groove in separating wall 12. The upper sliding block-sliding block guide pair 26, 28 comprises sliding block 26, integrally formed on upper valve body 16, and sliding block guide 28, formed as a groove in separating wall 12. See in particular FIG. 1 on this point.

In the present example, sliding block guides 24, 28 of the two sliding block-sliding block guide pairs 22, 24; 26, 28 are arranged offset from each other in the peripheral direction such that the first end position is mechanically fixed by means of the lower sliding block-sliding block guide pair 22, 24 and the second end position is mechanically fixed by means of the upper sliding block-sliding block guide pair 26, 28. See in particular FIGS. 2a and 2b on this point. The second end position is mechanically fixed here by means of the second sliding block-sliding block guide pair 26, 28 shown in the top image plane of FIG. 2a, whereas sliding block 22 in sliding block guide 24, as shown in the bottom image plane of FIG. 2a, does not yet rest against one of the two ends of sliding block guide 24. The first end position is mechanically fixed here by means of the first sliding block-sliding block guide pair 22, 24 shown in the lower image plane of FIG. 2b, whereas sliding block 26 in sliding block guide 28, as shown in the upper image plane of FIG. 2b, does not yet rest against one of the two ends of sliding block 28.

Figure 1:
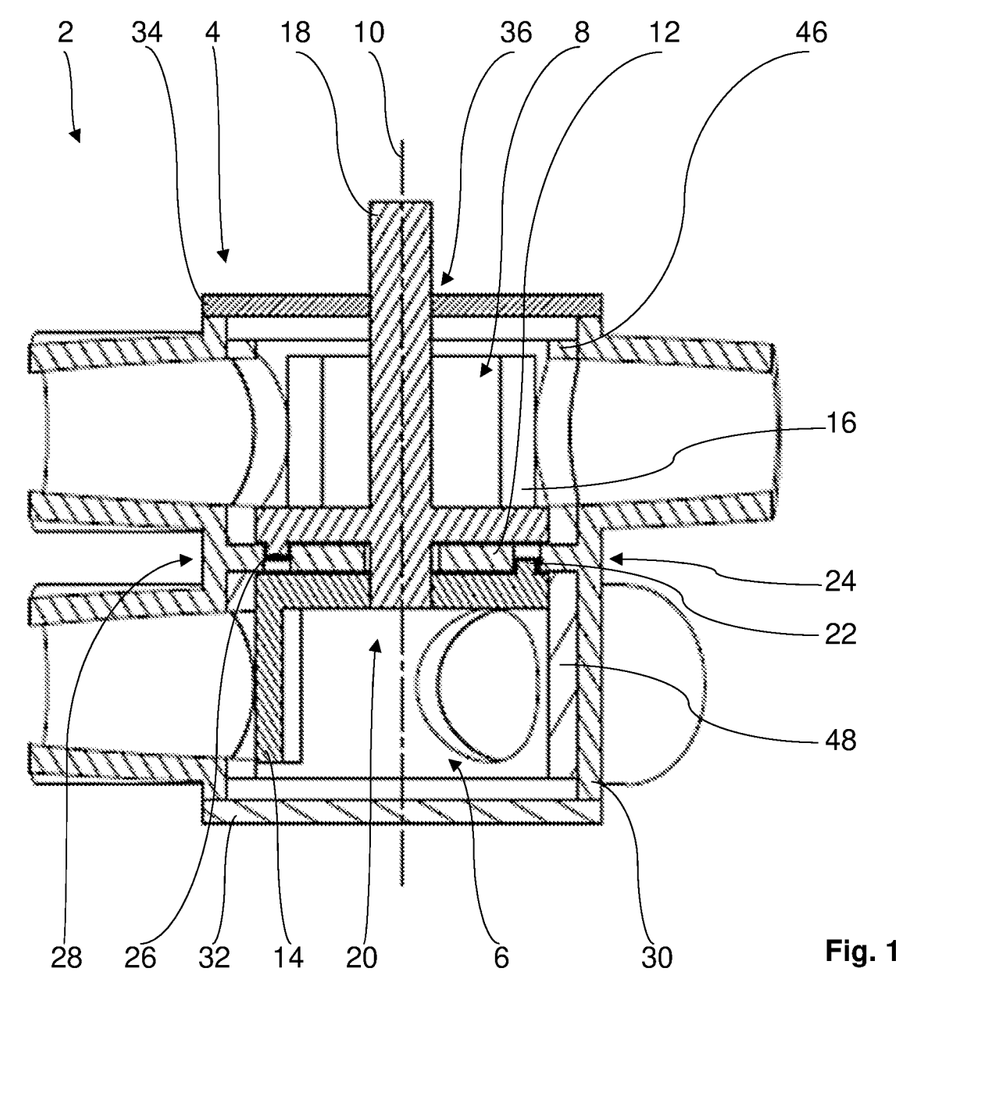
FIG. 1 shows an example of the multi-way valve of the invention for a motor vehicle in a sectional side view.
Figure 2A:
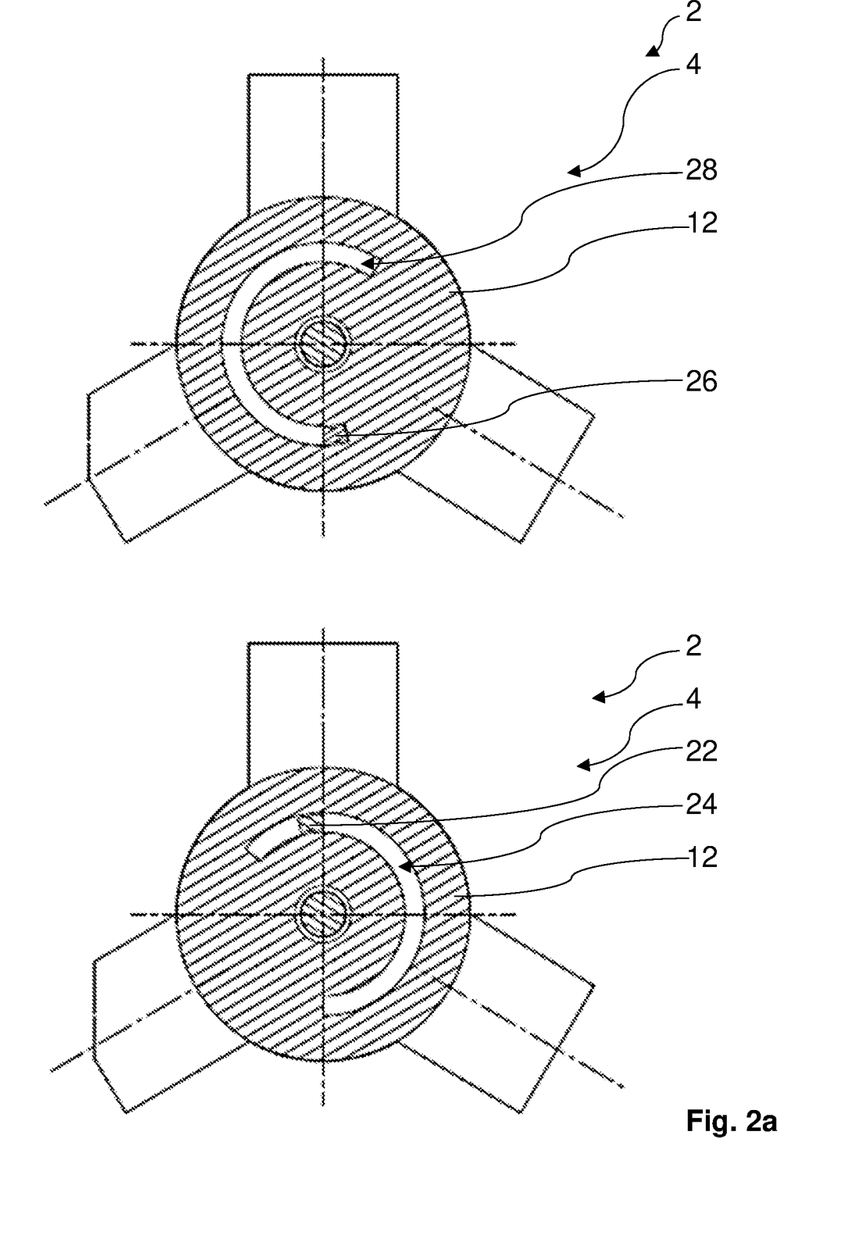
FIG. 2a shows the example in a sectional bottom view of the separating wall (image plane above) and in a sectional top view of the separating wall (image plane below), with the two valve bodies in a first end position.
Figure 2B:
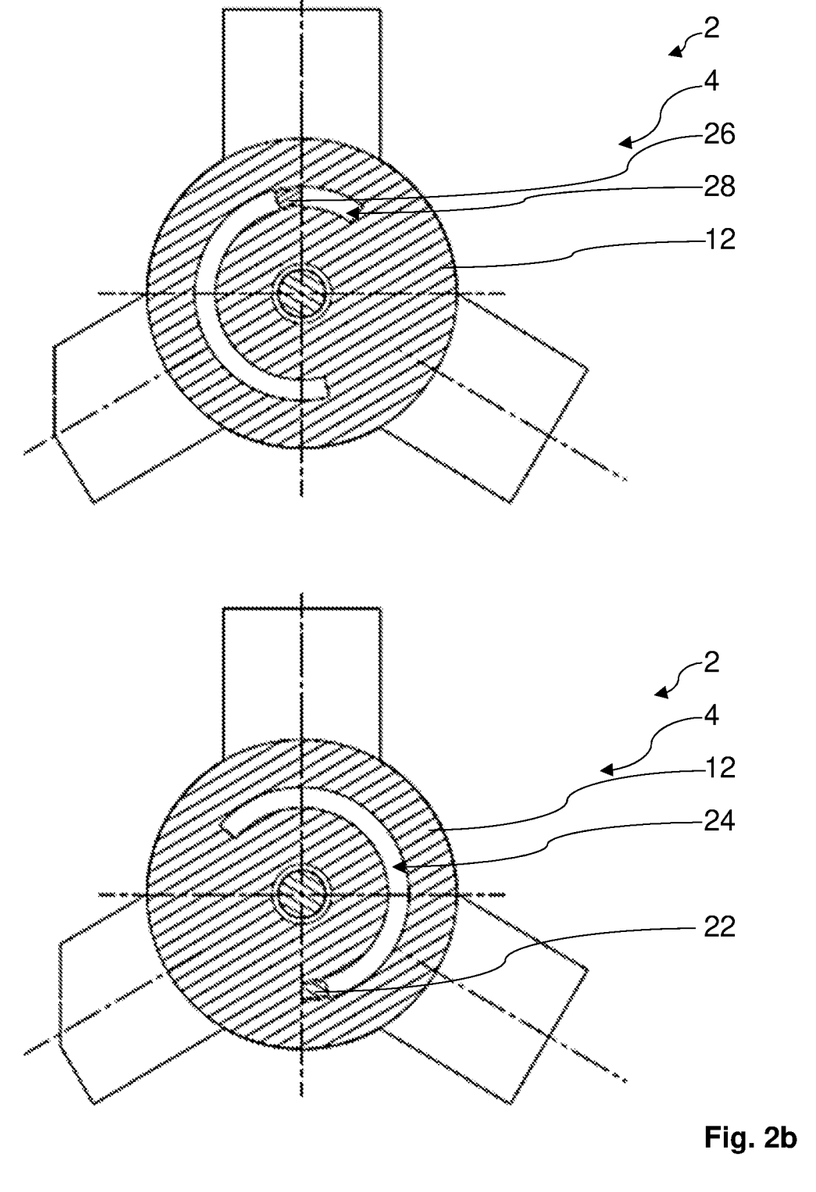
FIG. 2b shows the example in a sectional bottom view of the separating wall (image plane above) and in a sectional top view of the separating wall (image plane below), with the two valve bodies in a second end position.
Figure 3A:
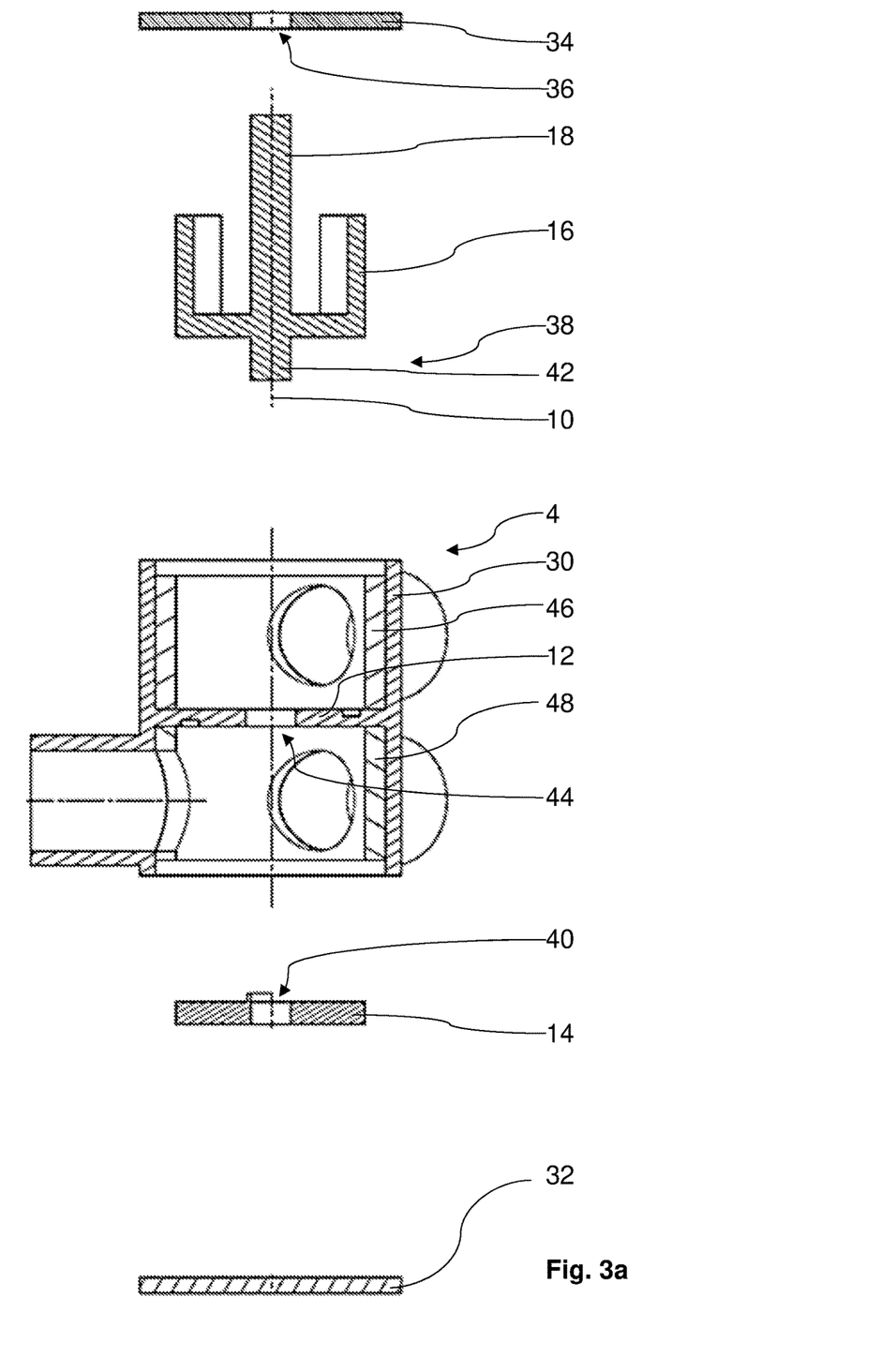
FIG. 3a shows the example in a sectional exploded view.
Figure 3B:
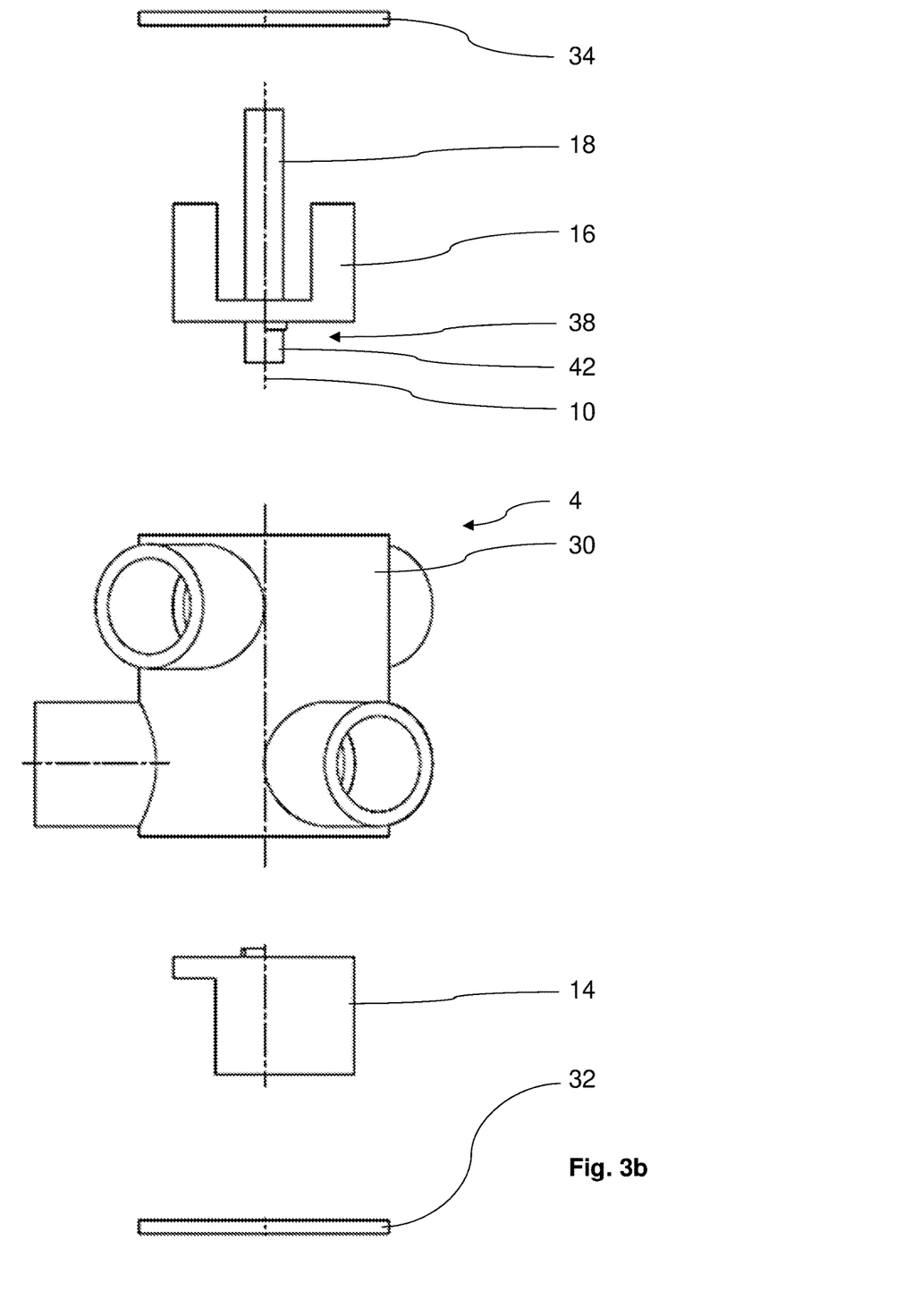
Figure 4A:
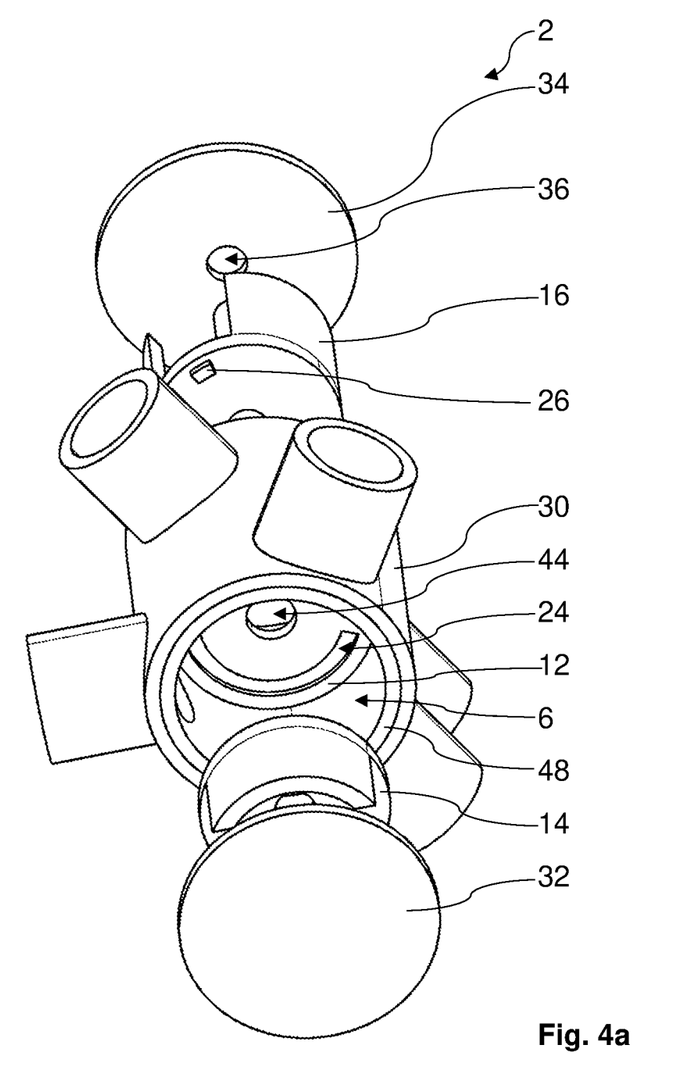
FIG. 4a shows the example in a first perspective exploded view.
Figure 4B:
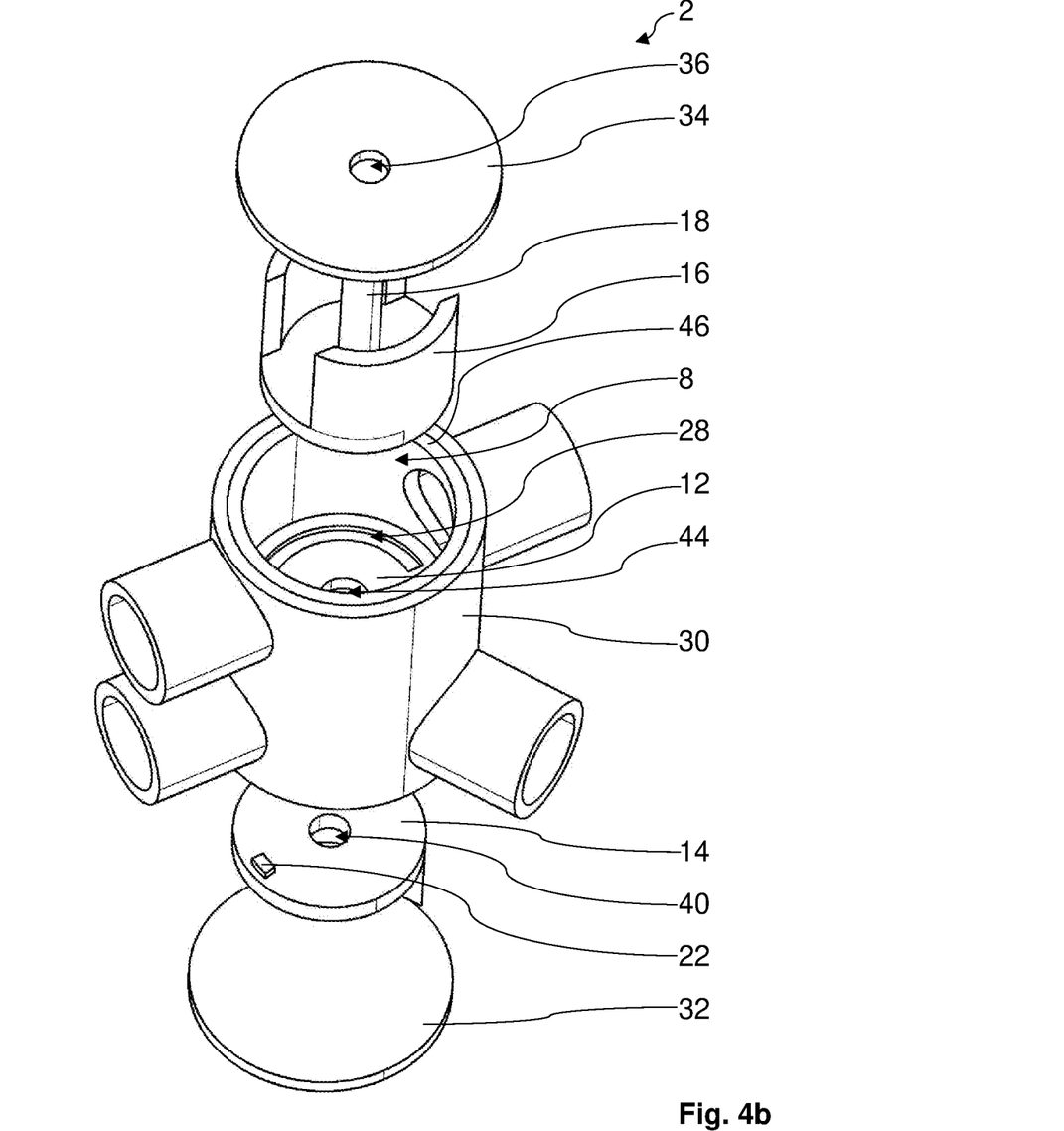
FIG. 4b shows the example in a second perspective exploded view.

As can be seen from an overview of FIGS. 2a and 2b, the nominal angle of rotation here is 180°, wherein each of sliding block guides 24, 28 of the two sliding block-sliding block guide pairs 22, 24; 26, 28 enables a range of rotation angles greater than 180°.

Further, in the present example, housing 4 has a housing shell 30, wherein a lower and upper open end of housing shell 30 are substantially tightly coverable by means of a lower and upper housing cover 32, 34, wherein a drive shaft opening 36 is disposed in upper housing cover 34 for passage of drive shaft 18.

Upper valve body 16, which is torque-transmittingly connected to drive shaft 18, is mechanically connected to lower valve body 14 by means of a coupling 38 for the purpose of torque transmission, wherein coupling 38 has a lower coupling part 40, associated with lower valve body 14, and an upper coupling part 42, associated with upper valve body 16, and wherein upper coupling part 42 extends through a coupling opening 44 in separating wall 12. Lower coupling part 40 is formed as an integral part of lower valve body 14, namely, as a receptacle, and upper coupling part 42 is formed as an integral part of upper valve body 16, namely, as a projection. See in particular FIG. 3a on this point.

Seals are arranged between housing 4 and lower valve body 14 and upper valve body 16 and between housing shell 30 and lower and upper housing covers 32, 34 and between drive shaft 18 and upper housing cover 34 and between separating wall 18 and upper coupling part 42. For example, the seals can each be formed as an integral part of one of the aforementioned components of multi-way valve 2. Seals 46, 48 are shown in FIGS. 1, 3a, 4a, and 4b purely by way of example.

The mode of operation of the multi-way valve of the invention and the method of the invention according to the present example will be explained in more detail hereinbelow with reference to FIGS. 1 to 4b.

First, the two valve bodies 14, 16 of multi-way valve 2 are in the second end position shown in FIG. 2a. This second end position is mechanically fixed by means of upper sliding block-sliding block guide pair 26, 28, as already explained above. See the upper illustration in FIG. 2a on this point. In fact, lower valve body 14 could theoretically rotate even further counterclockwise, relative to the lower illustration in FIG. 2a, due to lower sliding block-sliding block guide pair 22, 24. However, this is prevented by the aforementioned mechanical fixation by means of upper sliding block-sliding block guide pair 26, 28.

If the two valve bodies 14, 16 of multi-way valve 2 are now transferred from their second end position to their first end position by means of drive shaft 18, sliding block 22, with reference to the lower illustration in FIG. 2b, moves clockwise in sliding block guide 24 until sliding block 22 rests against the end of sliding block guide 24 corresponding to the first end position. As can be seen from the upper illustration of FIG. 2b, it would be possible here that upper valve body 16 could theoretically rotate even further clockwise, relative to the upper illustration in FIG. 2b, due to upper sliding block-sliding block guide pair 26, 28. However, this is prevented by the aforementioned mechanical fixation by means of lower sliding block-sliding block guide pair 22, 24.

Multi-way valve 2 is mechanically faultless and the actual angle of rotation determined by means of the sensor when the two valve bodies 14, 16 rotate about axis of rotation 10 corresponds to the nominal angle of rotation, namely 180°. By means of the controller, in which the measured actual angle of rotation and the nominal angle of rotation are compared, no error in the relative alignment in the peripheral direction of the two valve bodies is thus detected.

In the event of a fault, therefore, when lower valve body 14 is rotated in the peripheral direction relative to upper valve body 16 about axis of rotation 10, it would be possible to rotate the two valve bodies 14, 16 by more than 180° about axis of rotation 10 due to the aforementioned mechanical design of checking device 20. Accordingly, the sensor would detect an actual angle of rotation greater than 180° and the comparison of this actual angle of rotation with the nominal angle of rotation of 180°, stored in the controller, would not result in a match. Depending on the incorrect relative alignment, detected in the aforementioned manner, of the two valve bodies 14, 16 in the peripheral direction, a reaction to said detected incorrect alignment would be automatically triggered by means of the controller. For example, the reaction to the detected incorrect alignment could be the outputting of an error message which can be perceived visually and/or acoustically by the user, therefore, the driver of the electric vehicle. It is also conceivable that a function of the electric vehicle is automatically restricted or prevented due to the detected incorrect alignment.

Due to the design of multi-way valve 2 according to the invention for a motor vehicle and the method for operating multi-way valve 2 for a motor vehicle, mechanical damage to multi-way valve 2 of the invention, for example, can be reliably detected, in particular on lower valve body 14, which is only driven indirectly by means of upper valve body 16, which is directly driven by means of drive shaft 18. The aforementioned mechanical damage may be, for example, a failure of the positive and/or non-positive connection of lower valve body 14 to upper valve body 16, which is directly driven by means of drive shaft 18.

The invention is not limited to the present example. For example, the invention can also be used advantageously in other types of motor vehicles.

In furtherance to the present example of the multi-way valve of the invention, in other examples of the invention it can be provided that a separate seal is arranged between the housing and the lower valve body and/or upper valve body and/or between the housing shell and the lower and/or upper housing cover and/or between the drive shaft and the lower or upper housing cover and/or between the separating wall and the lower or upper coupling part. This ensures the sealing of the multi-way valve of the invention to the free environment, on the one hand, and the sealing of the individual components of the multi-way valve of the invention moving towards each other, on the other hand, in an alternative way. Further, it is possible to better adapt the respective seal to the requirements of the particular individual case. This applies, for example, to the selection of materials.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A multi-way valve for a motor vehicle, the multi-way valve comprising:
    a housing in which a lower and upper chamber are disposed one above the other along an axis of rotation and are separated from each other in a substantially sealed manner via a separating wall;
    a lower valve body disposed in the lower chamber for rotation about the axis of rotation;
    an upper valve body disposed in the upper chamber for rotation about the axis of rotation;
    a drive shaft for automatically driving the lower and upper valve bodies, the drive shaft being torque-transmittingly connected to one of the lower and upper valve bodies, and the one of the lower and upper valve bodies being torque-transmittingly connected to the other of the lower and upper valve bodies; and
    a checking device to check for a correct alignment in a peripheral direction of the lower valve body relative to the upper valve body, and, depending on an incorrect relative alignment of the upper and lower valve bodies in the peripheral direction, a reaction to the detected incorrect alignment is automatically triggered,
    wherein the checking device comprises a lower sliding block-sliding block guide pair disposed on the separating wall and the lower valve body, and comprises an upper sliding block-sliding block guide pair disposed on the separating wall and the upper valve body.

2. The multi-way valve according to claim 1, wherein the checking device has a controller and a sensor connected to the controller in a signal-transmitting manner for automatically determining an actual angle of rotation when the lower and upper valve bodies are rotated from a first end position to a second end position, wherein the actual angle of rotation is compared in the controller with a predetermined nominal angle of rotation when the lower and upper valve bodies rotate about the axis of rotation, and wherein the actual angle of rotation, with a correct relative alignment in the peripheral direction of the lower and upper valve bodies corresponds to the nominal angle of rotation.

3. The multi-way valve according to claim 2, wherein sliding block guides of the upper and lower sliding block-sliding block guide pairs are arranged offset from each other in the peripheral direction such that the first end position is mechanically fixed by one of the upper and lower sliding block-sliding block guide pairs and the second end position is mechanically fixed by the other of the upper and lower sliding block-sliding block guide pairs.

4. The multi-way valve according to claim 3, wherein the nominal angle of rotation is 180°, wherein each of the sliding block guides of the upper and lower sliding block-sliding block guide pairs enables a range of rotation angles greater than 180°.

5. The multi-way valve according to claim 1, wherein the housing has a housing shell, wherein a lower and upper open end of the housing shell are substantially tightly coverable by a lower and upper housing cover, and wherein a drive shaft opening for the passage of the drive shaft is arranged in one of the lower and upper housing covers.

6. The multi-way valve according to claim 1, wherein the drive shaft is formed as an integral part of the lower or upper valve body.

7. The multi-way valve according to claim 1, wherein the one of the lower and upper valve body, which is torque-transmittingly connected to the drive shaft, is mechanically connected to the other of the lower and upper valve body by a coupling for torque transmission, wherein the coupling has a lower coupling part, associated with the lower valve body, and an upper coupling part associated with the upper valve body, and wherein the lower or upper coupling part projects through a coupling opening in the separating wall, and wherein the lower coupling part is formed as an integral part of the lower valve body and/or the upper coupling part is formed as an integral part of the upper valve body.

8. The multi-way valve according to claim 1, wherein a separate seal is disposed in each case between the housing and the lower valve body and/or the upper valve body and/or between the housing shell and the lower and/or upper housing cover and/or between the drive shaft and the lower or upper housing cover and/or between the separating wall and the lower or upper coupling part.

9. A method for operating a multi-way valve, the method comprising:
  providing the multi-way valve according to claim 1; and
  depending on an incorrect relative alignment of the lower and upper valve bodies in the peripheral direction, a reaction to a detected incorrect alignment is automatically triggered.

* * * * *